US010723337B2

(12) United States Patent
Burte

(10) Patent No.: US 10,723,337 B2
(45) Date of Patent: Jul. 28, 2020

(54) BRAKE CONTROL SYSTEM CHANNEL PROTECTION

(71) Applicant: Goodrich Corporation, Charlotte, NC (US)

(72) Inventor: Paul R Burte, Clayton, OH (US)

(73) Assignee: Goodrich Corporation, Charlotte, NC (US)

(*) Notice: Subject to any disclaimer, the term of this patent is extended or adjusted under 35 U.S.C. 154(b) by 199 days.

(21) Appl. No.: 15/820,007

(22) Filed: Nov. 21, 2017

(65) Prior Publication Data
US 2019/0106095 A1 Apr. 11, 2019

Related U.S. Application Data

(60) Provisional application No. 62/568,670, filed on Oct. 5, 2017.

(51) Int. Cl.
B64C 25/42 (2006.01)
B60T 13/66 (2006.01)
B60T 8/17 (2006.01)
B60T 8/171 (2006.01)
B60T 13/68 (2006.01)
B60T 17/22 (2006.01)
B60T 13/14 (2006.01)

(52) U.S. Cl.
CPC ............ B60T 13/662 (2013.01); B60T 8/17 (2013.01); B60T 8/171 (2013.01); B60T 8/1703 (2013.01); B60T 13/14 (2013.01); B60T 13/148 (2013.01); B60T 13/66 (2013.01); B60T 13/68 (2013.01); B60T 13/686 (2013.01); B60T 17/22 (2013.01); B60T 17/221 (2013.01); B60T 2270/40 (2013.01)

(58) Field of Classification Search
CPC ...... F15B 1/022; F15B 20/005; B60T 8/1703; B60T 8/325
See application file for complete search history.

(56) References Cited

U.S. PATENT DOCUMENTS

| 8,894,159 | B2 | 11/2014 | Nakata et al. |
| 9,016,301 | B2* | 4/2015 | Tichborne ............... G01M 3/18 137/68.11 |
| 9,376,096 | B2* | 6/2016 | Knight ..................... B60T 13/14 |
| 9,718,450 | B2 | 8/2017 | Bruex et al. |
| 10,507,814 | B2* | 12/2019 | Zell ....................... B60T 8/1703 |

(Continued)

FOREIGN PATENT DOCUMENTS

| EP | 2857267 | 4/2015 |
| WO | 0069721 | 11/2000 |
| WO | 2009089551 | 7/2009 |

OTHER PUBLICATIONS

European Patent Office, European Search Report dated Jul. 25, 2019 in Application No. 18198780.1.

Primary Examiner — Bradley T King
(74) Attorney, Agent, or Firm — Snell & Wilmer L.L.P.

(57) ABSTRACT

A brake control system (BCS) may comprise a shutoff valve configured to receive pressurized fluid, a one-way check valve configured to route the pressurized fluid, a first pressure transducer coupled between the one-way check valve and the shutoff valve, and an accumulator configured to supply pressurized fluid to a brake control valve module (BCVM) in response to the shutoff valve being in a closed position.

16 Claims, 4 Drawing Sheets

(56) References Cited

U.S. PATENT DOCUMENTS

| | | | |
|---|---|---|---|
| 2009/0242694 A1* | 10/2009 | Oyama | F15B 1/022 244/99.6 |
| 2011/0046901 A1* | 2/2011 | Boissonneau | F15B 1/022 702/50 |
| 2015/0314765 A1 | 11/2015 | Maruo et al. | |
| 2016/0016575 A1* | 1/2016 | Howell | B60T 8/325 701/3 |
| 2016/0016576 A1* | 1/2016 | Howell | B60T 8/1703 701/3 |
| 2019/0248478 A1* | 8/2019 | Crane | B64F 5/60 |

* cited by examiner

BRAKE CONTROL SYSTEM CHANNEL PROTECTION

CROSS REFERENCE TO RELATED APPLICATIONS

This application claims priority to, and the benefit of, U.S. Provisional Patent Application Ser. No. 62/568,670, entitled "BRAKE CONTROL SYSTEM CHANNEL PROTECTION," filed on Oct. 5, 2017. The '670 Application is hereby incorporated by reference in its entirety for all purposes.

FIELD

The present disclosure relates to aircraft brake control systems.

BACKGROUND

Gross leakage of hydraulic fluid from a channel of a brake control system may limit braking function and may limit other aircraft functionalities.

SUMMARY

A brake control system (BCS) is disclosed, comprising a shutoff valve configured to receive pressurized fluid, a one-way check valve configured to route the pressurized fluid, a first pressure transducer coupled between the one-way check valve and the shutoff valve, and an accumulator configured to supply the pressurized fluid to a brake control valve module (BCVM) in response to the shutoff valve being in a closed position.

In various embodiments, the BCS further comprises a controller, wherein the shutoff valve and the first pressure transducer are in electronic communication with the controller.

In various embodiments, the controller is configured to send a control signal to the shutoff valve in response to a leak being detected in the BCS, the shutoff valve configured to move to the closed position in response to the control signal.

In various embodiments, the first pressure transducer is configured to measure a pressure of the BCS, the controller configured to detect the leak using the pressure measured by the first transducer.

In various embodiments, the first pressure transducer is configured to detect the leak in the BCS at a location between the one-way check valve and the shutoff valve.

In various embodiments, the BCS further comprises a second pressure transducer coupled to the accumulator and configured to monitor an accumulator pressure.

In various embodiments, the one-way check valve is coupled between the first pressure transducer and the accumulator.

In various embodiments, the accumulator is configured to store energized hydraulic fluid.

In various embodiments, the accumulator is configured to supply the energized hydraulic fluid to the BCVM in response to the controller detecting the leak in the BCS, the leak located upstream from the one-way check valve.

A brake control system (BCS) is disclosed, comprising a hydraulic fluid supply, a brake control valve module (BCVM), a park emergency system coupled in parallel with the BCVM, a shuttle valve (SV), wherein the SV receives pressurized hydraulic fluid from the hydraulic fluid supply via the BCVM, and the SV receives the pressurized hydraulic fluid from the hydraulic fluid supply via the park emergency system, a shutoff valve, a first one-way check valve, a first pressure transducer, and a first accumulator configured to supply pressurized fluid to the BCVM in response to a leak being detected in the BCS via the first pressure transducer.

In various embodiments, the shutoff valve is coupled between the first one-way check valve and the hydraulic fluid supply.

In various embodiments, the first pressure transducer is coupled between the shutoff valve and the first one-way check valve.

In various embodiments, the first accumulator is coupled between the first one-way check valve and the BCVM.

In various embodiments, the BCS further comprises a second pressure transducer coupled to the first accumulator and configured to monitor an accumulator pressure.

In various embodiments, the park emergency system comprises a second accumulator, and a park emergency valve.

In various embodiments, the BCS further comprises a second one-way check valve coupled between the park emergency system and the shutoff valve.

In various embodiments, the BCS further comprises a controller, wherein the shutoff valve and the first pressure transducer are in electronic communication with the controller, the controller configured to move the shutoff valve to a closed position in response to the controller detecting the leak in the BCS using the first pressure transducer.

In various embodiments, the SV is configured to supply pressurized fluid to a brake.

A method for shutoff valve control is disclosed, comprising receiving, by a controller, a pressure signal from pressure transducer, detecting, by the controller, a leak in a brake control system (BCS), and sending, by the controller, a control signal to a shutoff valve, wherein the shutoff valve moves to a closed position in response to the control signal.

In various embodiments, the leak is detected utilizing the pressure signal.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Various embodiments of an arrangement of line replaceable units (LRUs) are intended to allow for gross leakage from a brake control system to have minimal effect to an aircraft. Various embodiments are intended to minimize braking loss in response to gross hydraulic leakages. Various embodiments are intended to isolate emergency brake line failures from the brake control system.

Figure 1:
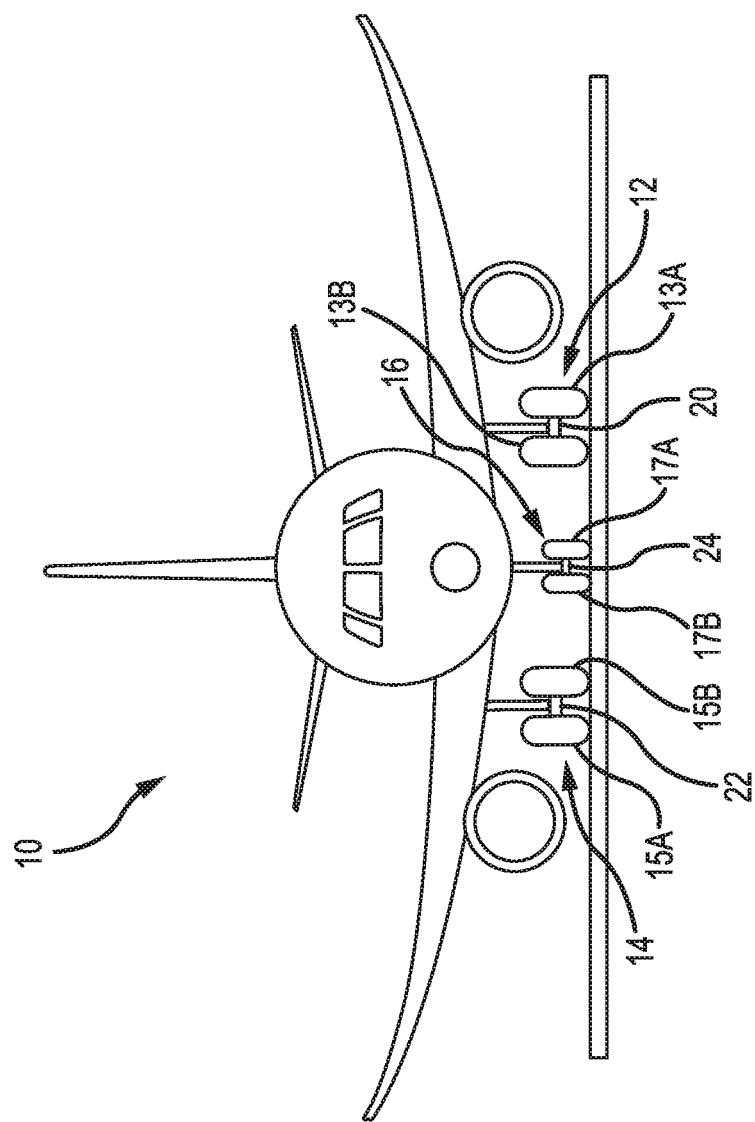
FIG. 1 illustrates a perspective view of an aircraft, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An XYZ axes is used in FIG. 1 to illustrate the axial (y), forward (x) and vertical (z) directions relative to axle 22.

Figure 2:
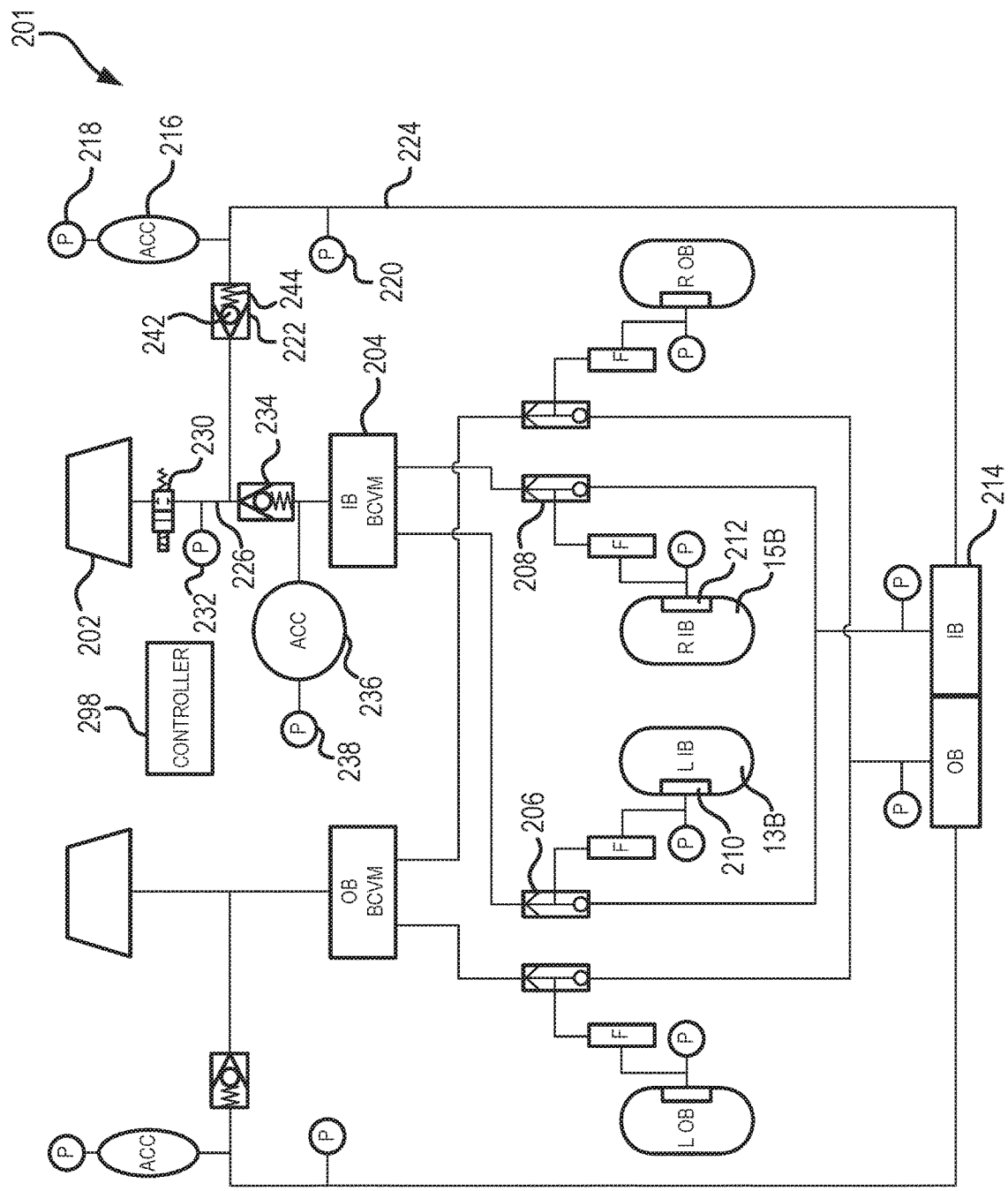
FIG. 2 illustrates a schematic view of a brake control system (BCS), in accordance with various embodiments.

With reference to FIG. 2, a brake control system (BCS) 200 is illustrated, in accordance with various embodiments. BCS 200 may include a hydraulic fluid supply 202. Hydraulic fluid supply 202 may comprise a pressure vessel. BCS 200 may include a brake control valve module (BCVM) 204. In the illustrated embodiment, BCVM 204 is an inboard brake control valve module (IB BCVM). However, the systems and methods described herein may be equally useful for an outboard brake control valve module (OB BCVM). BCS 200 may include a first shuttle valve (SV) 206. BCS 200 may include a second SV 208. Hydraulic fluid supply 202 may supply pressurized hydraulic fluid to BCVM 204. BCVM 204 may supply the pressurized hydraulic fluid to SV 206. Brake 210 may receive the pressurized hydraulic fluid from BCVM 204, via SV 206. Brake 210 may apply a braking force to wheel 13B to decelerate wheel 13B, in response to receiving the pressurized hydraulic fluid from SV 206. BCVM 204 may supply the pressurized hydraulic fluid to SV 208. Brake 212 may receive the pressurized hydraulic fluid from BCVM 204, via SV 208. Brake 212 may apply a braking force to wheel 15B to decelerate wheel 15B, in response to receiving the pressurized hydraulic fluid from SV 208.

In various embodiments, BCS 200 may include park emergency system 201, comprising a park emergency valve 214, an accumulator 216, and a pressure transducer 218. Park emergency valve 214 may be utilized when an aircraft is parked, or stationary. Park emergency valve 214 may be utilized in an emergency, such as in the event that BCVM 204 fails for example. Park emergency valve 214 may receive pressurized hydraulic fluid from hydraulic fluid supply 202. Brake 210 and brake 212 may receive the pressurized hydraulic fluid from park emergency valve 214 via SV 206 and SV 208, respectively. In this regard, SV 206 may receive pressurized hydraulic fluid from both BCVM 204 and park emergency valve 214 and may selectively pass through the highest pressure hydraulic fluid to brake 210. Similarly, SV 208 may receive pressurized hydraulic fluid from both BCVM 204 and park emergency valve 214 and may selectively pass through the hydraulic fluid having the highest pressure to brake 212. In this regard, BCVM 204 and park emergency valve 214 may be coupled in parallel.

In various embodiments, accumulator 216 may be coupled between hydraulic fluid supply 202 and park emergency valve 214. Accumulator 216 may comprise a pressure vessel. Accumulator 216 may receive pressurized hydraulic fluid from hydraulic fluid supply 202 and store the pressurized hydraulic fluid for use by park emergency valve 214. In various embodiments, accumulator 216 may comprise a pressure vessel having a piston dividing a gas chamber from a hydraulic fluid chamber. The gas chamber may energize accumulator 216, thereby pressurizing the hydraulic fluid chamber.

Park emergency system 201 may be in fluid communication with hydraulic fluid supply 202 via a one-way check valve 222. Check valve 222 may comprise a moveable member 242 and a spring member 244. Spring member 244 may bias moveable member 242 to prevent hydraulic fluid from flowing from accumulator 216, through check valve 222, to conduit 226. However, pressurized hydraulic fluid in conduit 226 may overcome the bias of spring member 244, moving moveable member 242 to allow hydraulic fluid to flow from hydraulic fluid supply 202 to conduit 224. Check valve 222 may be coupled between accumulator 216 and hydraulic fluid supply 202 to prevent hydraulic fluid from flowing from accumulator 216 to hydraulic fluid supply 202. Accumulator 216 may supply park emergency valve 214 with pressurized hydraulic fluid in an emergency such as, for example, in the event that hydraulic fluid supply 202 fails or in the event that a leak occurs upstream from check valve 222. In this regard, check valve 222 may isolate accumulator 216 from a leak in BCS 200 upstream from check valve 222.

In various embodiments, BCS 200 may include a controller 298. Controller 298 may comprise one or more processors. Controller 298 may comprise a tangible, non-transitory memory having instructions stored thereon.

A pressure transducer 218 may be coupled to accumulator 216. Pressure transducer 218 may send a signal corresponding to the pressure in accumulator 216 to controller 298. In this regard, pressure transducer 218 may be in electronic communication with controller 298. Controller 298 may monitor the health of accumulator 216 via pressure transducer 218. A pressure transducer 220 may be coupled between accumulator 216 and park emergency valve 214. Pressure transducer 220 may be in electronic communication with controller 298. Pressure transducer 220 may be coupled to a conduit 224. Controller 298 may monitor hydraulic fluid pressure in conduit 224 via pressure transducer 220.

Figure 3:
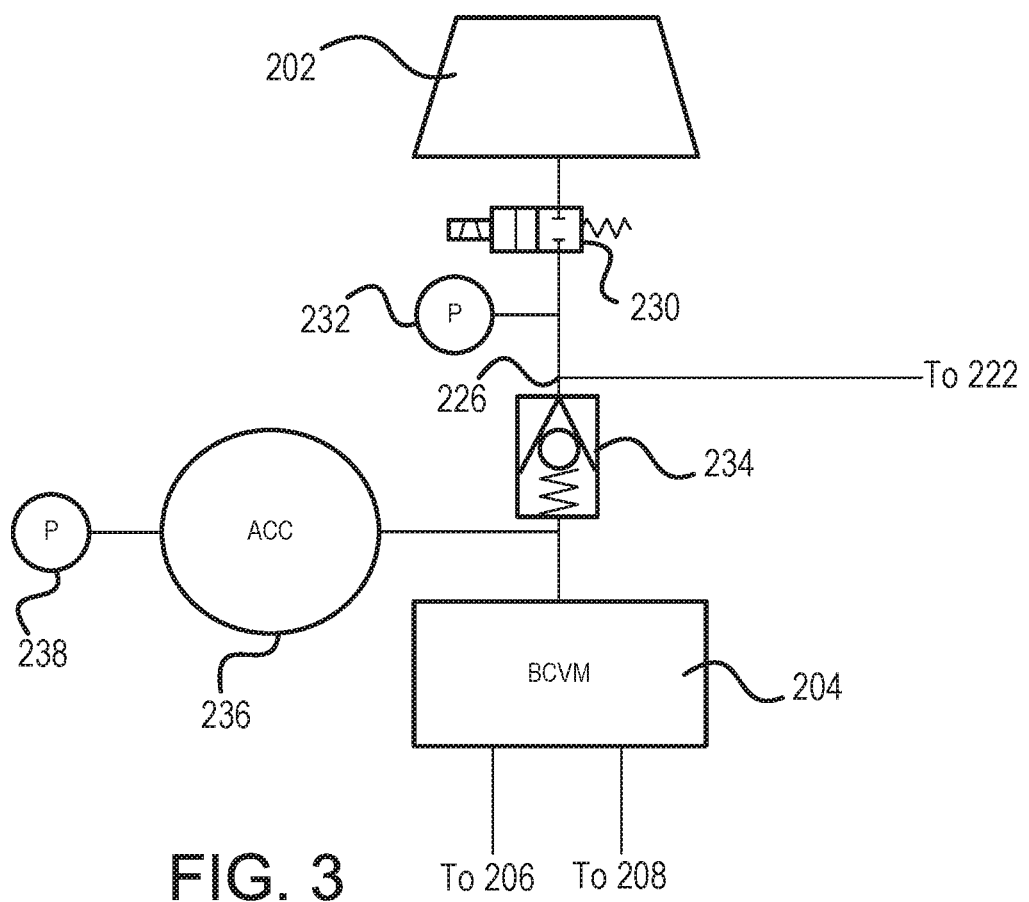
FIG. 3 illustrates a schematic view of a portion of the BCS of FIG. 2, in accordance with various embodiments.

With combined reference to FIG. 2 and FIG. 3, BCS 200 may include a valve 230. Valve 230 may comprise a shutoff valve. Valve 230 may comprise an electromechanical valve. Valve 230 may be in electronic communication with controller 298. Valve 230 may be selectively actuated between an open position and a closed position in response to a control signal received by valve 230 from controller 298.

In various embodiments, BCS 200 may include a pressure transducer 232 and a one-way check valve 234. Check valve 234 may be similar to check valve 222. Pressure transducer 232 may be coupled between valve 230 and check valve 234. In various embodiments, BCS 200 may include an accumulator 236. Accumulator 236 may be coupled between check valve 234 and BCVM 204. Accumulator 236 may store energized hydraulic fluid and may supply the pressurized hydraulic fluid to BCVM 204 in an emergency such as, for example, in the event that hydraulic fluid supply 202 fails or in the event of a leak in conduit 226, upstream from check valve 234. In various embodiments, accumulator 236 may supply energized hydraulic fluid to BCVM 204 in response to pressure transducer 232 detecting a leak in conduit 226. Check valve 234 may be coupled between BCVM 204 and valve 230. Check valve 234 may be configured to route pressurized hydraulic fluid from hydraulic fluid supply 202 to accumulator 236. Check valve 234 may be configured to route pressurized hydraulic fluid from hydraulic fluid supply 202 to BCVM 204. Check valve 234 may prevent hydraulic fluid from flowing from accumulator 236 towards hydraulic fluid supply 202. In this regard, check valve 234 may isolate accumulator 236 from a leak in conduit 226 upstream from check valve 234. In various embodiments, the capacity of accumulator 236 may be greater than the capacity of accumulator 216. The capacity of accumulator 236 may be sufficient to provide hydraulic pressure to brake 210 and/or brake 212 for decelerating an aircraft for at least one landing event.

In various embodiments, controller 298 may monitor the pressure of hydraulic fluid downstream of valve 230 and upstream from check valve 234 using pressure transducer 232. Controller 298 may send a control signal (e.g., a voltage signal or a current signal) to valve 230 in response to a loss of pressure in conduit 226. Valve 230 may actuate (e.g., via a solenoid or an electric motor) to a closed position in response to the control signal. Accumulator 236 may supply BCVM 204 with pressurized hydraulic fluid in response to valve 230 moving to the closed position. A pressure transducer 238 may be coupled to accumulator 236. Pressure transducer 238 may monitor the health of accumulator 236. For example, pressure transducer 238 may monitor the pressure within accumulator 236 (also referred to herein as an accumulator pressure). Pressure transducer 238 may be in electronic communication with controller 298.

In various embodiments, valve 230, pressure transducer 232, check valve 234, accumulator 236, and/or pressure transducer 238 may be line replaceable units (LRUs). An LRU may be a device which is relatively easily replaced.

In various embodiments, valve 230 may be configured to be closed in response to valve 230 being located above a pre-determined altitude, such as 5,000 feet above the ground for example. Valve 230 may be configured to be opened in response to the valve being located below a pre-determined altitude, such as less than 5,000 feet above the ground for example.

Figure 4:
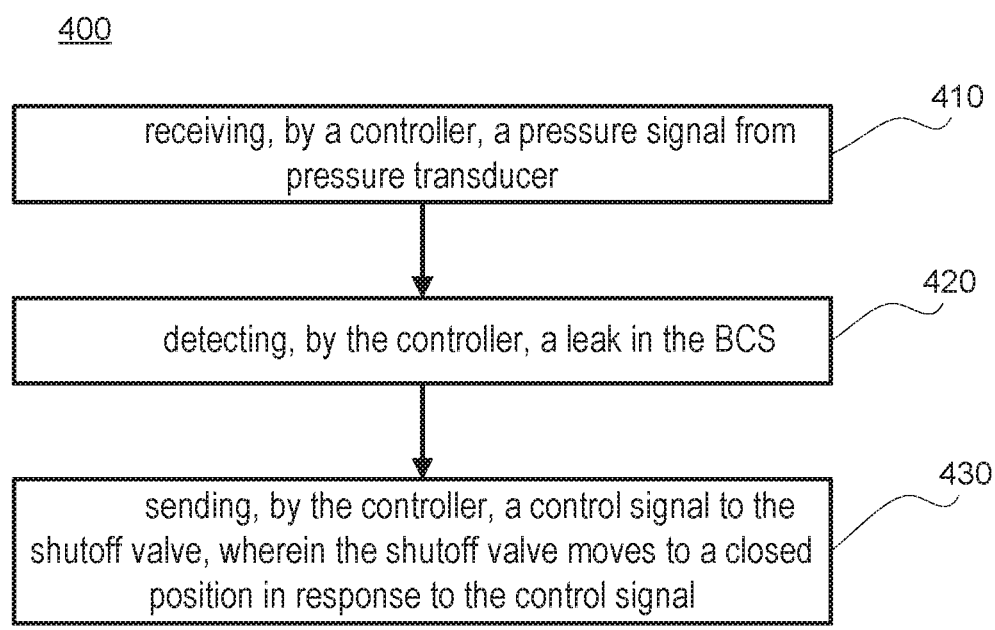
FIG. 4 illustrates a method for shutoff valve control, in accordance with various embodiments.

With reference to FIG. 4, a method 400 for shutoff valve control is provided, in accordance with various embodiments. Method 400 includes receiving, by a controller, a pressure signal from pressure transducer (step 410). Method 400 includes detecting, by the controller, a leak in the BCS (step 420). Method 400 includes sending, by the controller, a control signal to a shutoff valve, wherein the shutoff valve moves to a closed position in response to the control signal (step 430).

With combined reference to FIG. 2 and FIG. 4, step 410 may include receiving, by controller 298, a pressure signal from pressure transducer 232. Step 420 may include detecting, by controller 298, a leak in BCS 200 (e.g., in conduit 226, valve 230, and/or hydraulic fluid supply 202). For example, controller 298 may detect a decrease in pressure using the pressure signal. Step 430 may include sending, by controller 298, a control signal to valve 230, wherein the valve 230 moves to a closed position in response to the control signal.

While the disclosure is described with reference to an inboard system, it will be understood by those skilled in the art that valve 230, pressure transducer 232, check valve 234, accumulator 236, and pressure transducer 238 may be utilized on an outboard system without departing from the spirit and scope of the disclosure.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake control system (BCS), comprising:
   a shutoff valve configured to receive pressurized fluid;
   a one-way check valve configured to route the pressurized fluid;
   a first pressure transducer coupled between the one-way check valve and the shutoff valve;
   an accumulator coupled downstream from the one-way check valve and upstream from a brake control valve module (BCVM); the accumulator is configured to supply the pressurized fluid to the BCVM in response to the shutoff valve being in a closed position;
   a second pressure transducer coupled to the accumulator and configured to monitor an accumulator pressure; and
   a controller in electronic communication with the shutoff valve and the first pressure transducer, wherein the controller is configured to send a control signal to the shutoff valve in response to a leak being detected in the BCS, the shutoff valve configured to move to the closed position in response to the control signal.

2. The BCS of claim 1, wherein the controller is configured to send a control signal to the shutoff valve in response to a leak being detected in the BCS, the shutoff valve configured to move to the closed position in response to the control signal.

3. The BCS of claim 2, wherein the first pressure transducer is configured to measure a pressure of the BCS, the controller configured to detect the leak using the pressure measured by the first transducer.

4. The BCS of claim 3, wherein the first pressure transducer is configured to detect the leak in the BCS at a location between the one-way check valve and the shutoff valve.

5. The BCS of claim 1, wherein the one-way check valve is coupled between the first pressure transducer and the accumulator.

6. The BCS of claim 3, wherein the accumulator is configured to store energized hydraulic fluid.

7. The BCS of claim 6, wherein the accumulator is configured to supply the energized hydraulic fluid to the BCVM in response to the controller detecting the leak in the BCS, the leak located upstream from the one-way check valve.

8. A brake control system (BCS), comprising:
   a hydraulic fluid supply;
   a brake control valve module (BCVM);
   a park emergency system coupled in parallel with the BCVM;
   a shuttle valve (SV), wherein the SV receives pressurized hydraulic fluid from the hydraulic fluid supply via the BCVM, and the SV receives the pressurized hydraulic fluid from the hydraulic fluid supply via the park emergency system;
   a shutoff valve;
   a first one-way check valve;
   a first pressure transducer;
   a first accumulator coupled downstream from the one-way check valve and upstream from the BCVM; the first accumulator is configured to supply pressurized fluid to the BCVM in response to a leak being detected in the BCS via the first pressure transducer; and
   a second pressure transducer coupled to the first accumulator and configured to monitor an accumulator pressure.

9. The BCS of claim 8, wherein the shutoff valve is coupled between the first one-way check valve and the hydraulic fluid supply.

10. The BCS of claim 9, wherein the first pressure transducer is coupled between the shutoff valve and the first one-way check valve.

11. The BCS of claim 10, wherein the first accumulator is coupled between the first one-way check valve and the BCVM.

12. The BCS of claim 11, wherein the park emergency system comprises:
    a second accumulator; and
    a park emergency valve.

13. The BCS of claim 12, further comprising a second one-way check valve coupled between the park emergency system and the shutoff valve.

14. The BCS of claim 8, further comprising a controller, wherein the shutoff valve and the first pressure transducer are in electronic communication with the controller, the controller configured to move the shutoff valve to a closed position in response to the controller detecting the leak in the BCS using the first pressure transducer.

15. The BCS of claim 8, wherein the SV is configured to supply pressurized fluid to a brake.

16. A method for shutoff valve control for a brake control system (BCS), wherein the BCS comprises:
    a shutoff valve configured to receive pressurized fluid;
    a one-way check valve configured to route the pressurized fluid;
    a first pressure transducer coupled between the one-way check valve and the shutoff valve;
    an accumulator coupled downstream from the one-way check valve and upstream from a brake control valve module (BCVM); the accumulator is configured to supply the pressurized fluid to the BCVM in response to the shutoff valve being in a closed position;
    a second pressure transducer coupled to the accumulator and configured to monitor an accumulator pressure; and
    a controller in electronic communication with the shutoff valve and the first pressure transducer, wherein the controller is configured to send a control signal to the shutoff valve in response to a leak being detected in the BCS, the shutoff valve configured to move to the closed position in response to the control signal;
    the method comprising:
      receiving, by the controller, a pressure signal from the first pressure transducer;
      detecting, by the controller, a leak in a brake control system (BCS), wherein the leak is detected utilizing the pressure signal; and
      sending, by the controller, a control signal to the shutoff valve, wherein the shutoff valve moves to a closed position in response to the control signal.

* * * * *